United States Patent
Soda et al.

(10) Patent No.: US 7,525,774 B2
(45) Date of Patent: Apr. 28, 2009

(54) MAGNETO-RESISTANCE EFFECT TYPE MAGNETIC HEAD AND MAGNETIC TAPE APPARATUS

(75) Inventors: Yutaka Soda, Kanagawa (JP); Masaaki Sekine, Kanagawa (JP)

(73) Assignee: Sony Corporation (JP)

( * ) Notice: Subject to any disclaimer, the term of this patent is extended or adjusted under 35 U.S.C. 154(b) by 486 days.

(21) Appl. No.: 11/229,074

(22) Filed: Sep. 19, 2005

(65) Prior Publication Data
US 2006/0067011 A1  Mar. 30, 2006

(30) Foreign Application Priority Data
Sep. 29, 2004 (JP) ............... P2004-284867

(51) Int. Cl.
G11B 5/33 (2006.01)
G11B 5/127 (2006.01)

(52) U.S. Cl. .............. 360/324.11; 360/324.12
(58) Field of Classification Search .......... 360/324.1, 360/324.11, 324.12
See application file for complete search history.

(56) References Cited

U.S. PATENT DOCUMENTS

| | | | | |
|---|---|---|---|---|
| 5,304,975 A | * | 4/1994 | Saito et al. | 338/32 R |
| 5,408,377 A | * | 4/1995 | Gurney et al. | 360/325 |
| 5,946,167 A | * | 8/1999 | Hara et al. | 360/322 |
| 5,995,338 A | * | 11/1999 | Watanabe et al. | 360/324.12 |
| 6,074,707 A | * | 6/2000 | Nakazawa et al. | 427/547 |
| 6,124,711 A | * | 9/2000 | Tanaka et al. | 324/252 |
| 6,828,897 B1 | * | 12/2004 | Nepela | 338/32 R |
| 6,927,950 B2 | * | 8/2005 | Ito et al. | 360/322 |
| 6,970,332 B2 | * | 11/2005 | Tetsukawa et al. | 360/324.1 |
| 2004/0075956 A1 | * | 4/2004 | Tetsukawa et al. | 360/324.1 |
| 2004/0136231 A1 | * | 7/2004 | Huai et al. | 365/158 |

FOREIGN PATENT DOCUMENTS

JP  06-326374  11/1994
JP  08-111010  4/1996

OTHER PUBLICATIONS

Japanese Office Action No. 2004-284867—Dated: Oct. 16, 2007.

* cited by examiner

Primary Examiner—Brian E Miller
Assistant Examiner—Adam B Dravininkas
(74) Attorney, Agent, or Firm—Rader Fishman & Grauer PLLC; Ronald P. Kananen

(57) ABSTRACT

A laser diode capable of being easily mounted and a laser diode device in which the laser diode is mounted are provided. A hole is disposed in a semiconductor layer, and a p-type electrode and an n-type semiconductor layer are electrically connected to each other by a bottom portion (a connecting portion) of the hole. Thereby, the p-type electrode has the same potential as the n-type semiconductor layer, and a saturable absorption region is formed in a region corresponding to a current path. Light generated in a gain region (not shown) is absorbed in the saturable absorption region so as to be converted into a current. The current is discharged to a ground via the p-side electrode and the bottom portion, an interaction between the saturable absorption region and the gain region is initiated, and thereby self-oscillation can be produced.

10 Claims, 10 Drawing Sheets

MAGNETO-RESISTANCE EFFECT TYPE MAGNETIC HEAD AND MAGNETIC TAPE APPARATUS

BACKGROUND OF THE INVENTION

The present invention relates to a magneto-resistance effect type magnetic head in which a spin valve film is used as a magnetic sensing device for detecting a magnetic signal while contacting in sliding motion with a magnetic recording medium and a magnetic tape apparatus in which the magneto-resistance effect type magnetic head is incorporated.

A magneto-resistance effective device (hereinafter referred to as MR element) makes use of a magneto-resistance effect that the resistance value varies depending upon the magnitude and the direction of an external magnetic field. The MR element is used, for example, as an magnetic sensing device of a magnetic head or the like for detecting a signal magnetic field from a magnetic recording medium.

As such, an MR element as described above, a device is conventionally used wherein an anisotropic magneto-resistance effect is utilized. However, in such an MR element as just described, the magnetic resistance variation coefficient (MR ratio) is low. Therefore, an MR element having a still higher MR ratio is demanded. In recent years, a giant magneto-resistance effect device (hereinafter referred to as GMR element) in which a spin valve film is utilized has been proposed (refer to, for example, "Giant Magnetoresistance in Soft Ferromagnetic Multilayers", Physical Review B, vol. 43, No. 1, pp. 1297-1300, which is hereinafter referred to as Non-Patent Document 1, and Japanese Patent Laid-Open No. Hei 8-111010, which is hereinafter referred to as Patent Document 1).

A GMR element includes a spin valve film wherein a nonmagnetic layer is sandwiched by and between a pair of magnetic layers and utilizes an effect called a giant magneto-resistance effect in which the conductance of sense current flowing in an in-plane direction in the spin valve film varies depending upon the relative angle of magnetization between a pair of magnetic layers.

In particular, the spin valve film is structured such that an antiferromagnetic layer, a fixed magnetization layer having magnetization fixed in a predetermined direction by an exchange coupling magnetic field acting between the antiferromagnetic layer and the fixed magnetization layer, a free magnetization layer having a magnetization direction which varies in response to an external magnetic field, and a nonmagnetic layer for magnetically isolating the fixed magnetization layer and the free magnetization layer from each other are laminated.

In the GMR element in which the spin valve film is used, if an external magnetic field is applied, then the magnetization direction of the free magnetization layer varies in response to the magnitude or the direction of the external magnetic field. Then, when the magnetization direction of the free magnetization layer is the opposite direction (anti-parallel direction) with respect to the magnetization direction of the fixed magnetization layer, the resistance value of the sense current flowing in the spin valve film exhibits its maximum. On the other hand, when the magnetization direction of the free magnetization layer is the same direction (parallel direction) as the magnetization direction of the fixed magnetization layer, the resistance value of the sense current flowing in the spin valve film exhibits its minimum.

Accordingly, in the magnetic head which includes such a GMR element as described above (a head of this type is hereinafter referred to as GMR head), where constant sense current flows to the GMR element, the voltage value of the sense current flowing in the GMR element varies in response to a signal magnetic field from a magnetic recording medium. Thus, if the variation of the voltage value of the sense current is detected, then the magnetic signal from the magnetic recording medium can be read.

Patent Document 1 discloses a GMR head utilized in a hard disk drive. The hard disk drive is structured such that the GMR head is carried on a head slider attached, for example, to an end portion of a suspension. While air flows generated by rotation of a magnetic disk make the head slider float above a signal recording face of the magnetic disk, the GMR head carried on the head slider reads out a magnetic signal recorded on the magnetic disk, thereby performing a reproduction operation for the magnetic disk.

In recent years, the utilization of the GMR head not only in a magnetic disk apparatus but also in a magnetic tape apparatus, such as a tape streamer has been and is being investigated. For example, a tape streamer to which helical scanning is applied is structured such that the GMR head is disposed on an outer circumferential face of a rotary drum such that it is inclined obliquely with respect to a substantially orthogonal direction to a feeding direction of a magnetic tape in accordance with an azimuth angle. Further, in the tape streamer, the rotary drum is driven to rotate while the magnetic tape is fed in an oblique direction with respect to the rotary drum, and the GMR head carried on the rotary drum slidably moves on the magnetic tape to read out a magnetic signal recorded on the magnetic tape, thereby performing a reproduction operation of the magnetic tape.

In the tape streamer, preferably, the distance between the GMR head and the magnetic tape, that is, the spacing, is minimized. Therefore, from a point of view of the spacing, preferably, the surface of the magnetic tape is smoothed.

However, as the surface of the magnetic tape is smoothed into a mirror face, the contact area between the magnetic tape and the outer circumferential face of the rotary drum increases. This increases the frictional force acting between the magnetic tape and the rotary drum during feeding of the magnetic tape to such a degree that the magnetic tape and the rotary drum stick to each other, thereby obstructing smooth feeding of the magnetic tape. Therefore, such a contrivance is applied in which very small projections are provided on the surface of the magnetic tape using a Siol filler or an organic filler to decrease the contact area between the magnetic tape and the outer circumferential face of the rotary drum, thereby decreasing the frictional force acting between the magnetic tape and the rotary drum. Further, a protective film, such as a DLC film or the like, for preventing damage, corrosion and so forth is formed on the surface of the magnetic tape.

Incidentally, in the hard disk drive described above, a reproduction operation is performed in a state wherein the GMR head does not contact the signal recording face of the magnetic disk. Further, Cu is normally used for the nonmagnetic layer which forms the spin valve film. Conventionally, a protective film, such as a DLC (Diamond Like Carbon) film or the like, for preventing corrosion of the Cu is formed on a medium opposing the face of the GMR head which opposes the magnetic disk.

SUMMARY OF THE INVENTION

However, in a tape streamer to which it is examined to apply the GMR head at present, a reproduction operation is performed in a state wherein the GMR head remains in contact with a magnetic tape. Therefore, if a protective film for preventing the occurrence of corrosion or the like described above is formed on the medium sliding face of the GMR head which slidably moves on the magnetic tape, then the protective film is abraded through contact with the protective film or with very small projections formed on the surface of the magnetic tape upon the reproduction operation. Further, since the protective film formed on the medium sliding face of the GMR head provides spacing between the GMR head and the magnetic tape, it causes degradation of the short wavelength recording and reproducing characteristic of the GMR head.

Accordingly, it is considered inappropriate to form a protective film on the medium sliding face of a GMR head that is used in a magnetic tape apparatus, such as a tape streamer.

Therefore, in a magnetic tape apparatus, the medium sliding face of the GMR head touches directly with the atmospheric air. Consequently, there is a problem that, in severe use conditions such as a high-temperature, high-humidity condition or a seawater atmospheric condition, the GMR head is likely to suffer from corrosion and so forth.

Meanwhile, the sensitivity of the GMR head depends upon the sensor current flowing to the spin valve film. Further, the layers which form the spin valve film are formed in the film thickness of the nm order, and even if a little corrosion occurs with any layer, the electric resistance of the layer varies. Accordingly, the occurrence of corrosion on the medium sliding face of the GMR head significantly deteriorates the head characteristic of the GMR head.

In Patent Document 1, it is to enhance the corrosion resistance of a magneto-resistance effect type magnetic head to be applied to a hard disk. However, in a hard disk apparatus, a magnetic head does not move slidably directly on a medium. Therefore, it is apparent that the amount of damage by abrasion of a magnetic head is greater with the tape system. Further, in the hard disk apparatus, since the medium is kept in an enclosed state by a packaging and is not exposed to the external air, the problem of the influence of damage to a magnetic head by fine dust or the like also is considered more serious with the tape system. Therefore, it is significant to enhance the corrosion resistance of the GMR head to be applied to a magnetic tape apparatus more than that to be applied to a hard disk drive.

Figure 11A:
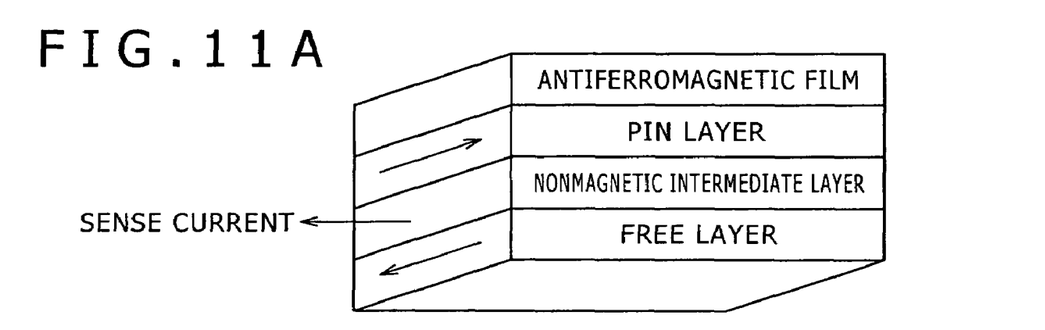
FIGS. 11A and 11B are schematic views showing a structure of a spin valve film and illustrating a principle of operation of the spin valve film.
Figure 11B:
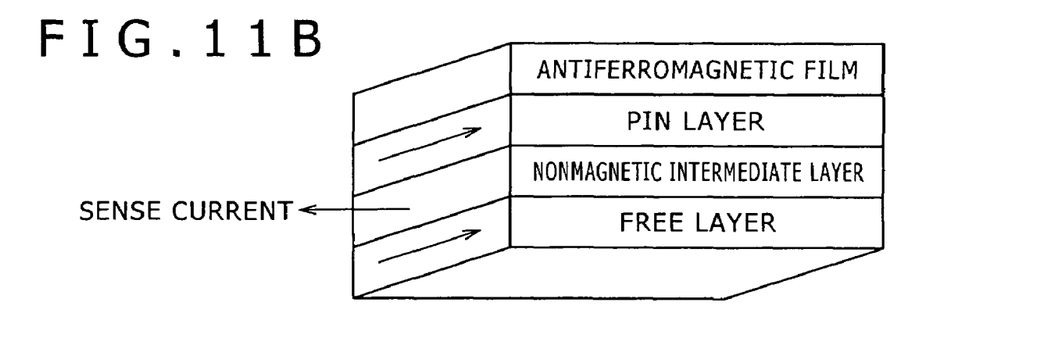

As described hereinabove, in the GMR element in which the spin valve film is used, if an external magnetic field is applied, then the magnetization direction of the free magnetization layer (free layer) varies in response to the magnitude or the direction of the external magnetic field. Then, when the magnetization direction of the free layer is the opposite direction (anti-parallel direction) with respect to the magnetization direction of the fixed magnetization layer (pin layer) (FIG. 11A), the resistance value of the sense current flowing in the spin valve film (nonmagnetic intermediate layer) exhibits its maximum. On the other hand, when the magnetization direction of the free layer is the same direction (parallel direction) as the magnetization direction of the pin layer (FIG. 11B), the resistance value of the sense current flowing in the spin valve film exhibits its minimum.

Figure 12:
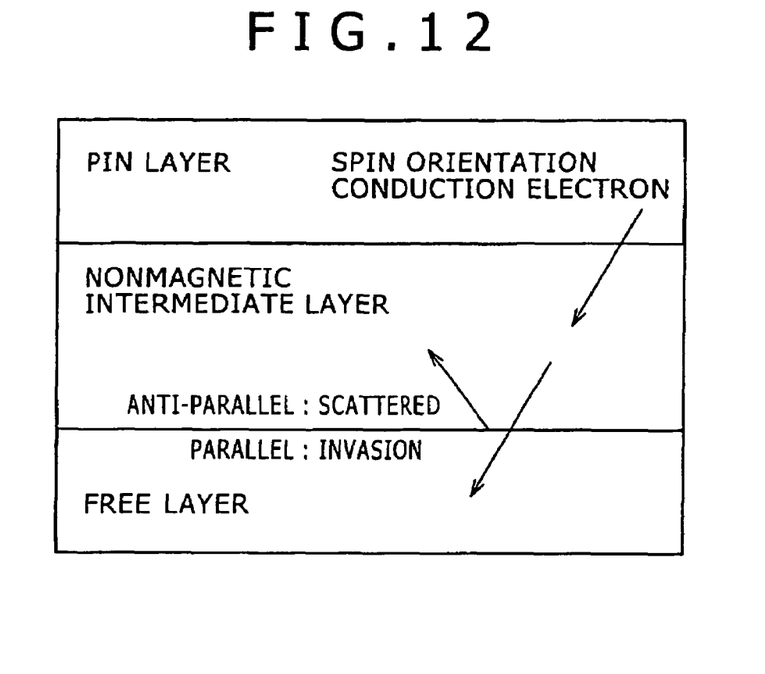
FIG. 12 is a schematic view illustrating a GMR effect of the spin valve film.

Further, the GMR effect of the spin valve film is such that, where the magnetization directions of the pin layer and the free layer are parallel to each other as seen in FIG. 12, conduction electrons incoming from the pin layer to the nonmagnetic intermediate layer are admitted into the free layer at a high probability without being scattered by the interface between the nonmagnetic intermediate layer and the free layer. However, where the magnetization directions of the pin layer and the free layer are anti-parallel to each other, conduction electrons incoming from the pin layer to the nonmagnetic intermediate layer are scattered significantly by the interface between the nonmagnetic intermediate layer and the free layer.

Figure 13:
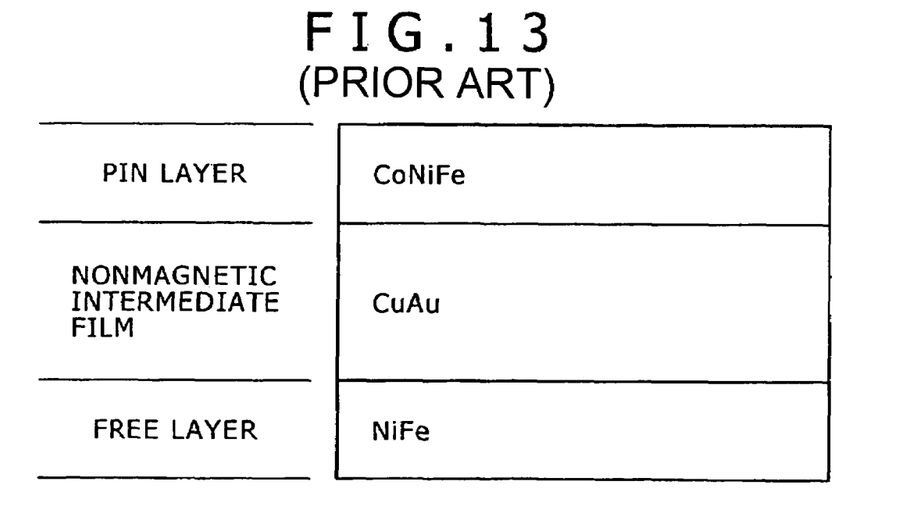
FIG. 13 is a schematic view showing a structure of the spin valve film.

In a popular GMR element, CoNiFe, which is a corrosion resisting material, is used for the pin layer; CuAu, which is a corrosion resisting alloy, is used for the nonmagnetic intermediate layer; and NiFe having a corrosion resisting property is used for the free layer, as seen in FIG. 13. Since Au has a high corrosion resisting property, the composition ratio of Au in the nonmagnetic intermediate layer is selected somewhat higher than that of Cu. This composition prevents the possible deterioration of the corrosion resisting property of the GMR head described hereinabove.

However, if the ratio of Au in the nonmagnetic intermediate layer is increased, then this gives rise to a problem that the GMR ratio of the entire GMR elements drops.

It is desired that the present invention provide a magneto-resistance effect type magnetic head which has a high sensitivity and a high corrosion resisting property.

In order to attain the desirable solution described above, according to an embodiment of the invention, there is provided a magneto-resistance effect type magnetic head, comprising a spin valve film acting as a magnetic sensing device for detecting a magnetic signal while contacting in sliding motion with a magnetic recording medium, the spin valve film being structured such that an antiferromagnetic layer, a fixed magnetization layer having magnetization fixed in a predetermined direction by an exchange coupling magnetic field acting between the antiferromagnetic layer and the fixed magnetization layer, a free magnetization layer having a magnetization direction which varies in response to an external magnetic field, and a nonmagnetic layer for magnetically isolating the fixed magnetization layer and the free magnetization layer from each other are laminated, the nonmagnetic layer being formed from a conductive layer having conductivity, a first interface layer formed on an interface between the fixed magnetization layer and the conductive layer, and a second interface layer formed on an interface between the conductive layer and the free magnetization layer.

In the magnetic resistance effect type magnetic head, a high corrosion resistance and a high GMR sensitivity can be implemented without forming a protective film, such as a DLC or the like, on the head surface, in order to avoid the influence of the sliding motion of the magnetic head on a medium, and a high GMR sensitivity also can be implemented in a high-temperature, high-humidity environment or a corroding environment.

According to another embodiment of the invention, there is provided a magnetic tape apparatus, comprising a tape feeding section for feeding a magnetic tape, and a magneto-resistance effect type magnetic head for detecting a magnetic signal while contacting in sliding motion with a magnetic tape fed by the tape feeding section, the spin valve film being structured such that an antiferromagnetic layer, a fixed magnetization layer having magnetization fixed in a predetermined direction by an exchange coupling magnetic field acting between the antiferromagnetic layer and the fixed magnetization layer, a free magnetization layer having a magnetization direction which varies in response to an external magnetic field, and a nonmagnetic layer for magnetically isolating the fixed magnetization layer and the free magnetization layer from each other are laminated, the nonmagnetic layer being formed from a conductive layer having conductivity, a first interface layer formed on an interface between the fixed magnetization layer and the conductive layer, and a second interface layer formed on an interface between the conductive layer and the free magnetization layer.

In the magnetic tape apparatus, a high corrosion resistance and a high GMR sensitivity can be implemented without forming a protective film, such as a DLC or the like, on the head surface, in order to avoid the influence of the sliding motion of the magnetic head on a medium, and a high GMR sensitivity also can be implemented in a high-temperature, high-humidity environment or a corroding environment.

The above and other objects, features and advantages of the present invention will become apparent from the following description and the appended claims, taken in conjunction with the accompanying drawings in which like parts or elements are denoted by like reference symbols.

DETAILED DESCRIPTION OF THE PREFERRED EMBODIMENTS

Figure 1:
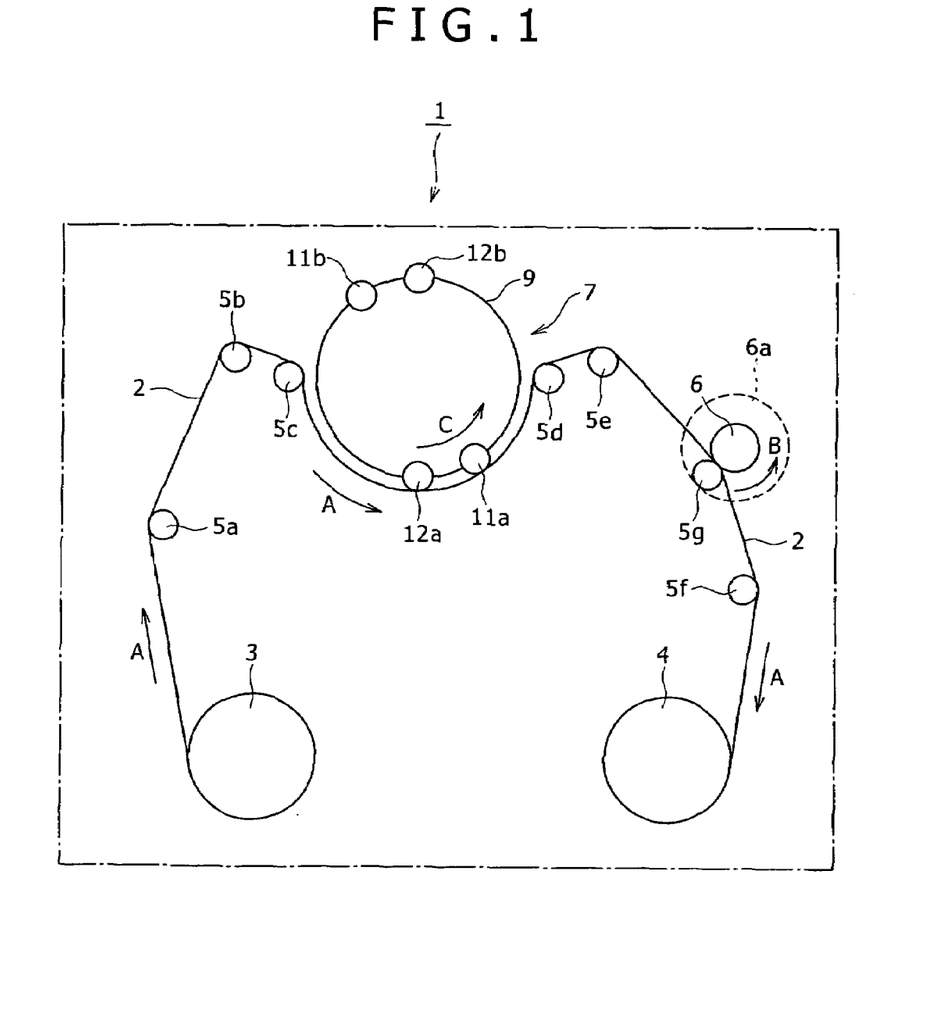
FIG. 1 is a schematic top plan view showing a recording and reproducing apparatus for a magnetic tape.

First, an example of a magnetic tape apparatus to which a magneto-resistance effect type magnetic head of the present invention is applied is described. Referring to FIG. 1, the magnetic tape apparatus 1 records and/or reproduces a signal on and/or from a magnetic tape 2 by helical scanning. The magnetic tape apparatus 1 includes a supply reel 3 for supplying the magnetic tape 2, a take-up reel 4 for taking up the magnetic tape 2 supplied thereto from the supply reel 3, and a plurality of guide rollers 5a to 5f for guiding the magnetic tape 2 between the supply reel 3 and the take-up reel 4. The magnetic tape 2 is fed in the direction indicated by arrow marks A in FIG. 1.

A pinch roller 5g for engaging with the magnetic tape 2, a capstan 6 for cooperating with the pinch roller 5g to sandwich the magnetic tape 2 therebetween and a capstan motor 6a for driving the capstan 6 to rotate are interposed as a tape feeding element between the guide roller 5e and the guide roller 5f.

The magnetic tape 2 is sandwiched between the pinch roller 5g and the capstan 6 so that, when the capstan 6 is driven to rotate in the direction indicated by an arrow mark B in FIG. 1 by the capstan motor 6a, the magnetic tape 2 is fed at a fixed speed and under a fixed tension in the direction indicated by the arrow marks A.

Figure 2:
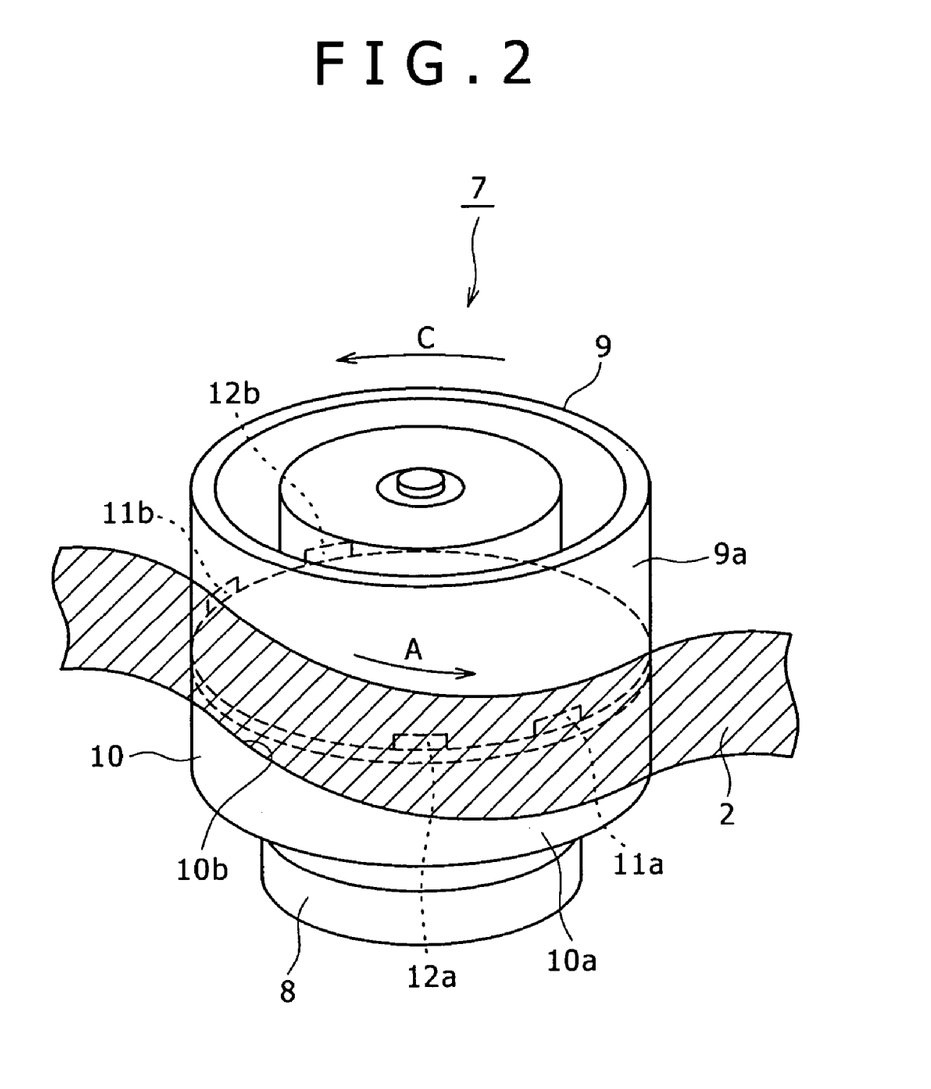
FIG. 2 is a schematic perspective view showing a head drum of the recording and reproducing apparatus of FIG. 1.

The magnetic tape apparatus 1 includes a head drum 7 positioned between the guide rollers 5c and 5d for performing a recording operation or a reproduction operation of a signal on or from the magnetic tape 2. Referring to FIG. 2, the head drum 7 includes a rotary drum 9 for being driven to rotate in the direction indicated by an arrow mark C in FIG. 2 by a drive motor 8 and a fixed drum 10 fixed to a base (not shown). An outer circumferential face 9a of the rotary drum 9 and an outer circumferential face 10a of the fixed drum 10 are aligned with each other.

The magnetic tape 2 is guided by the guide rollers shown in FIG. 1 and fed in such a state that it is wrapped helically over an angular range of approximately 180° on the outer circumferential faces 9a and 10a of the rotary drum 9 and the fixed drum 10. The outer circumferential face 10a of the fixed drum 10 has a lead guide 10b provided thereon for guiding the magnetic tape 2 such that the magnetic tape 2 is fed obliquely with respect to the direction of rotation of the rotary drum 9 along the lead guide 10b.

A pair of recording magnetic heads 11a and 11b for recording a signal on the magnetic tape 2 and a pair of reproducing magnetic heads 12a and 12b for reproducing a signal from the magnetic tape 2 are provided on the outer circumferential face 9a of the rotary drum 9. The recording magnetic head 11a and the reproducing magnetic head 12a and the recording magnetic head 11b and the reproducing magnetic head 12b are disposed in an opposing relationship to each other with a phase difference of 180° from each other on the outer circumferential face 9a of the rotary drum 9. Further, the recording magnetic heads 11a and 11b and the reproducing magnetic heads 12a and 12b are disposed such that the recording gaps and the reproduction gaps thereof extend obliquely in accordance with an azimuth angle with respect to a direction substantially perpendicular to the feeding direction of the magnetic tape 2.

Accordingly, on the head drum 7, while the magnetic tape 2 engaged with the outer circumferential faces 9a and 10a of the rotary drum 9 and the fixed drum 10 is fed in the direction indicated by an arrow mark A in FIG. 2, the rotary drum 9 is driven to rotate in the direction indicated by the arrow mark C in FIG. 2, whereupon the recording magnetic heads 11a and 11b and the reproducing magnetic heads 12a and 12b carried on the rotary drum 9 slidably move on the magnetic tape 2 to perform a recording operation or a reproduction operation of a signal.

More particularly, upon recording, the recording magnetic head 11a applies a magnetic field in accordance with a recording signal supplied thereto to form a recording track with a predetermined track width on the magnetic tape 2 while the other recording magnetic head 11b applies a magnetic field in accordance with a recording signal supplied thereto to form a recording track with a predetermined track width adjacent to the recording track on the magnetic tape 2. Thus, the recording magnetic heads 11a and 11b successfully form recording tracks on the magnetic tape 2 to record signals successively on the magnetic tape 2.

On the other hand, upon reproduction, the reproducing magnetic head 12a detects a signal magnetic field from a recording track recorded by the recording magnetic head 11a while the other reproducing magnetic head 12b detects a signal magnetic field from a recording track recorded by the recording magnetic head 11b. Then, the reproducing magnetic heads 12a and 12b detect signal electric fields from the recording tracks to successively reproduce signals recorded on the magnetic tape 2 successively.

Now, the magneto-resistance effect type magnetic head of the present invention is described in detail with reference to FIGS. 3 and 4.

Figure 3:
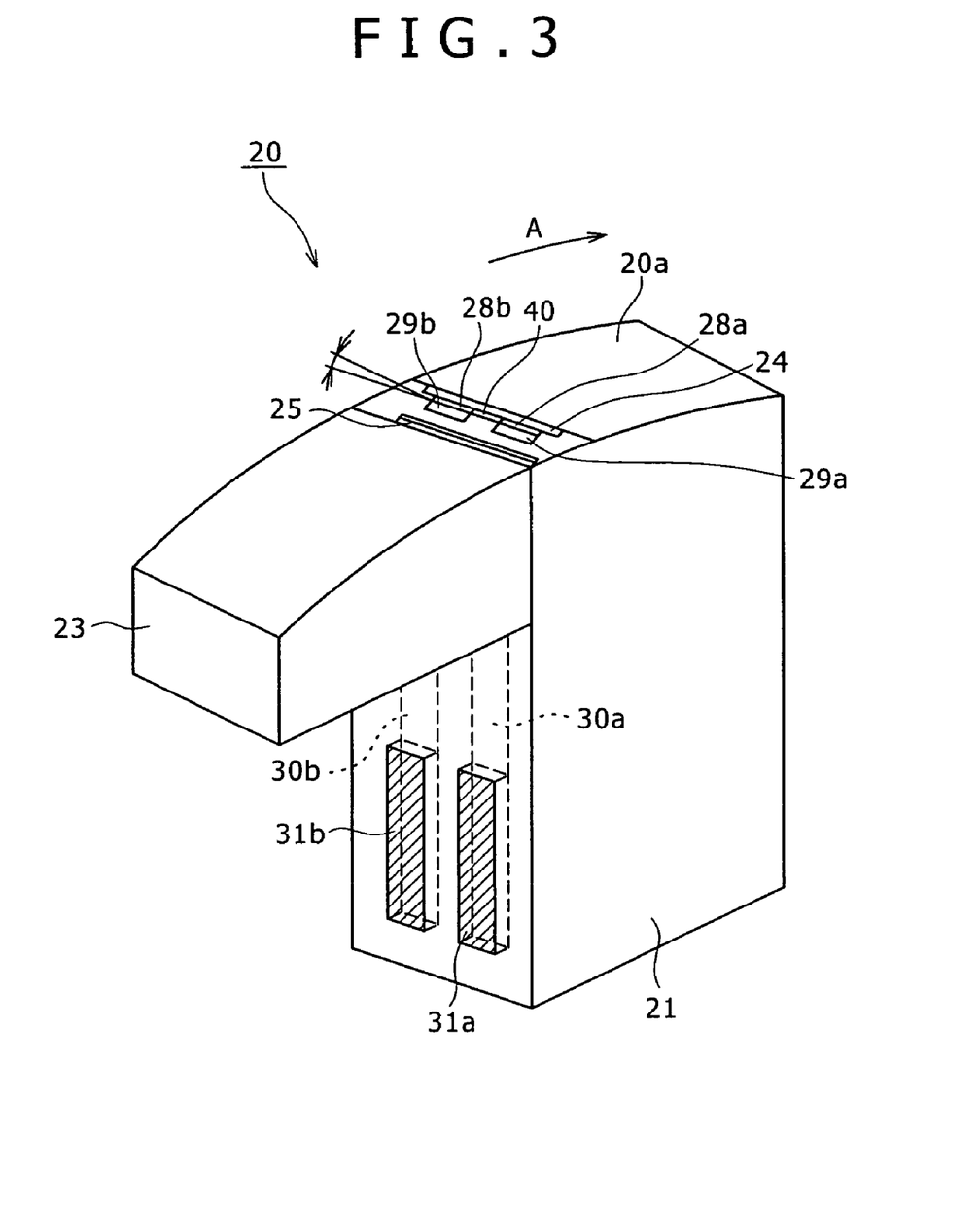
FIG. 3 is a schematic perspective view showing a magneto-resistance effect type magnetic head according to the present invention.

The magneto-resistance effect type magnetic head 20 shown in FIG. 3 is a giant magneto-resistance effect type magnetic head (hereafter referred to as GMR head) which includes a giant magneto-resistance effect element (hereinafter referred to as GMR element) formed by using a spin valve film as a magnetic sensing device which detects a magnetic signal from a magnetic recording medium.

The GMR head 20 has a sensitivity higher than that of an inductive type magnetic head which utilizes electromagnetic induction to perform recording or reproduction or an anisotropic magneto-resistance effect type magnetic head and hence exhibits a high reproduction output. Therefore, the GMR head 20 is suitable for high density recording. Accordingly, in the magnetic tape apparatus 1 described above, the GMR head 20 is used for the reproducing magnetic heads 12a and 12b to achieve higher density recording.

Figure 4:
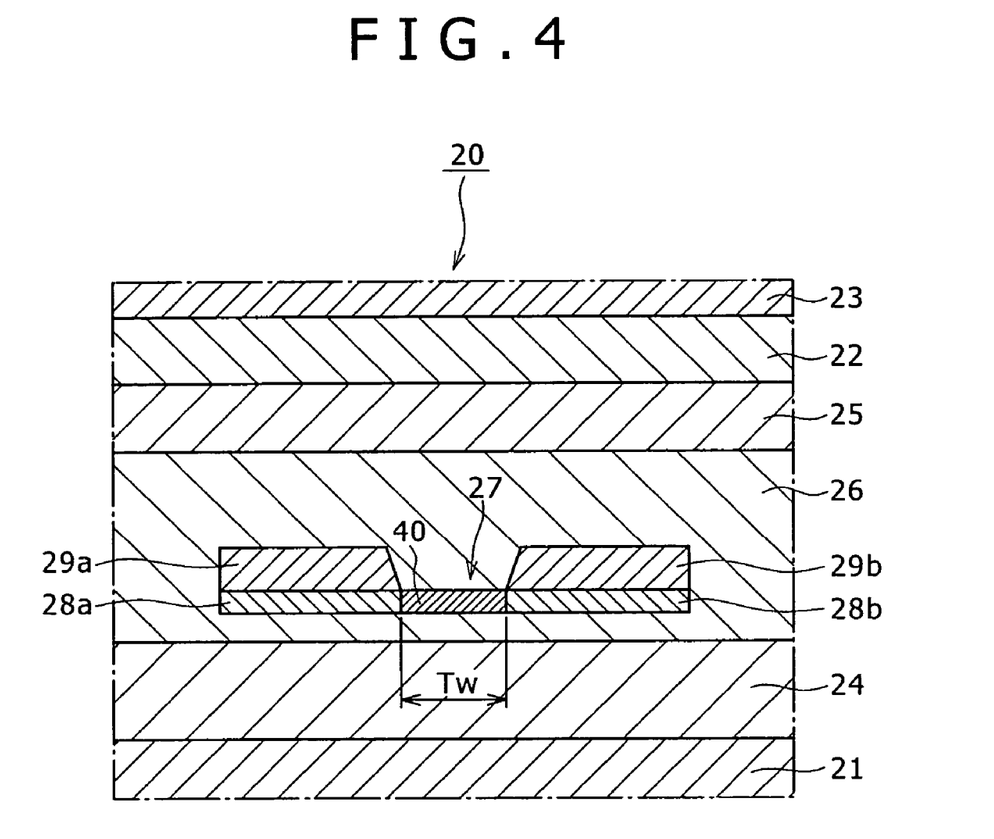
FIG. 4 is an end view of a GMR head shown in FIG. 3 as viewed from the medium contacting face side of the same.

In particular, referring to FIG. 4, each of the reproducing magnetic heads 12a and 12b includes a magnetic shield layer 24, a GMR element 27, a gap layer 26 and a shield layer 25 formed successively on a first core member 21, for example, by a suitable thin film forming technique such as plating, sputtering or vapor deposition. Further, each of the reproducing magnetic heads 12a and 12b includes a second core member 23 adhered to the shield layer 25 with a protective film 22 interposed therebetween. Each of the reproducing magnetic heads 12a and 12b slidably contacts at a medium sliding face 20a of the GMR head 20 thereof with the magnetic tape 2. The medium sliding face 20a is formed as a curved face that is curved substantially arcuately along the feeding direction of the magnetic tape 2 indicated by an arrow mark A in FIG. 3. Each of the reproducing magnetic heads 12a and 12b is disposed such that a reproduction gap exposed to the outside through the medium sliding face 20a extends obliquely in accordance with an azimuth angle θ with respect to a direction substantially perpendicular to the feeding direction of the magnetic tape 2.

It is to be noted that the reproducing magnetic heads 12a and 12b have a same configuration except that the azimuth angles θ thereof have opposite phases to each other. Accordingly, each of the reproducing magnetic heads 12a and 12b is hereinafter referred to as GMR head 20.

The GMR head 20 includes a magneto-resistance effect element (GMR element 27) embedded in the gap layer 26 and sandwiched between a pair of upper and lower magnetic shield layers 24 and 25, as seen in FIG. 4.

The magnetic shield layers 24 and 25 are each formed from a soft magnetic film having a width sufficient to magnetically shield the GMR element 27 and sandwich the GMR element 27 therebetween through the gap layer 26 such that they function so that a magnetic field other than a reproduction object magnetic field from within a signal magnetic field from the magnetic tape 2 may not be introduced into the GMR element 27. In particular, in the GMR head 20, a signal magnetic field other than a signal magnetic field of a reproduction object of the GMR element 27 is introduced into the magnetic shield layers 24 and 25 so that only the signal magnetic field of the reproduction object may be introduced to the GMR element 27. This achieves the enhancement of a frequency characteristic and a reading resolution of the GMR element 27.

The gap layer 26 is formed from a nonmagnetic nonconductive film for magnetically isolating the GMR element 27 and the magnetic shield layers 24 and 25 from each other. The distance between the magnetic shield layers 24 and 25 and the GMR element 27 is the gap length.

Figure 5A:
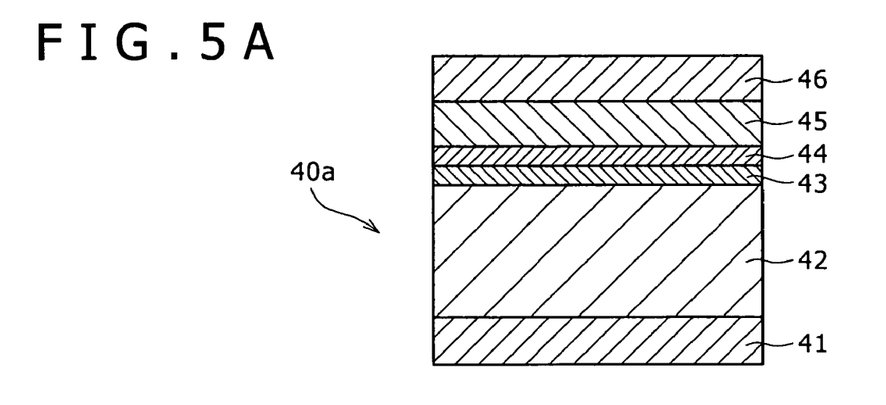
FIGS. 5A to 5C are schematic sectional views showing a bottom type spin valve film, a top type spin valve film and a dual type spin valve film, respectively.
Figure 5B:
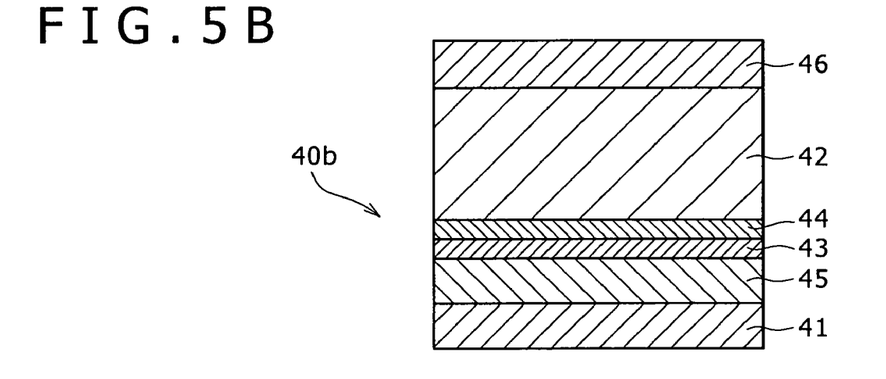
Figure 5C:
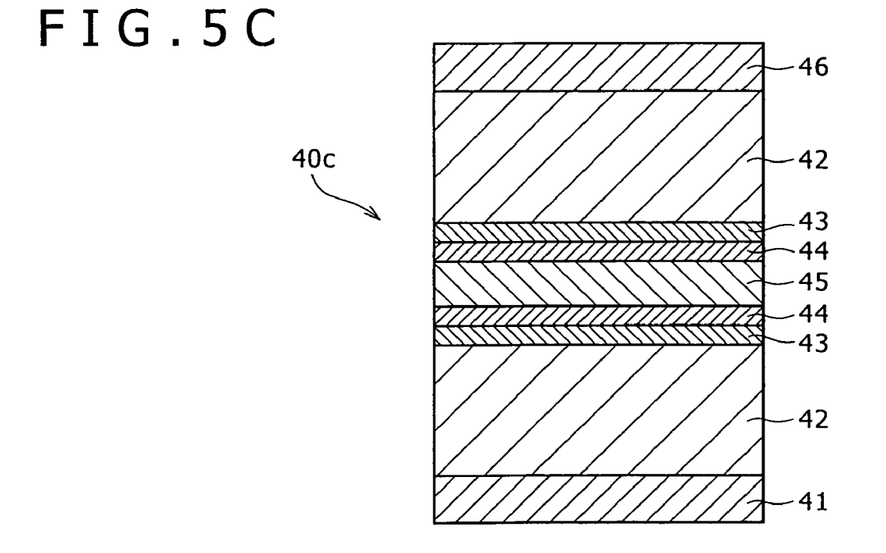

The GMR element 27 is formed from a spin valve film 40 and utilizes a giant magneto-resistance effect in which the conductance of sense current following in an in-plane direction of the spin valve film 40 varies depending upon the relative angle of magnetization between a pair of magnetic layers. The spin valve film 40 may be any of a bottom type spin valve film 40a as shown in FIG. 5A, a top type spin valve film 40b as shown in FIG. 5B, a dual type spin valve film 40c as shown in FIG. 5C or the like. The spin valve film 40a shown in FIG. 5A is structured such that a ground layer 41, a antiferromagnetic layer 42, a fixed magnetization layer 43, a nonmagnetic layer 44, a free magnetization layer 45 and a protective film 46 are laminated in order. The spin valve film 40b shown in FIG. 5B is structured such that a ground layer 41, a free magnetization layer 45, a nonmagnetic layer 44, a fixed magnetization layer 43, a antiferromagnetic layer 42 and a protective film 46 are laminated in order. The spin valve film 40c shown in FIG. 5C is structured such that a ground layer 41, a antiferromagnetic layer 42, a fixed magnetization layer 43, a nonmagnetic layer 44, a free magnetization layer 45, another nonmagnetic layer 44, another fixed magnetization layer 43, another antiferromagnetic layer 42 and a protective film 46 are laminated in order.

The fixed magnetization layer 43 which forms the spin valve film is disposed adjacent to the antiferromagnetic layer 42 such that the magnetization thereof is fixed to a predetermined direction by an exchange coupling magnetic field acting between the fixed magnetization layer 43 and the antiferromagnetic layer 42. On the other hand, the free magnetization layer 45 is isolated magnetically from the fixed magnetization layer 43 by the nonmagnetic layer 44 such that the magnetization direction thereof can vary readily in response to a weak external magnetic field.

Accordingly, if an external magnetic field is applied to the spin valve film 40, then the magnetization direction of the free magnetization layer 45 varies in are provided at the opposite end portions in the longitudinal direction of the spin valve film 40, as seen in FIGS. 3 and 4. The width of a portion of the GMR element 27 sandwiched between the permanent magnet films 28a and 28b is given as a reproduction track width Tw of the GMR element 27. Further, a pair of resistance reducing films 29a and 29b for reducing the resistance value of the GMR element 27 are provided on the permanent magnet films 28a and 28b, respectively.

Further, a pair of conductor portions 30a and 30b for supplying sense current to the spin valve film are provided for the GMR element 27 such that they are connected at one end side thereof to the permanent magnet films 28a and 28b and the resistance reducing films 29a and 29b, respectively. Further, a pair of externally connecting terminals 31a and 31b are provided on the other end side of the conductor portions 30a and 30b, respectively, and connected to an external circuit.

The protective film 22 covers a principal face of the first core member 21 on which the GMR head 20 is formed, except for portions at which the externally connecting terminals 31a and 31b are exposed to the outside, and joins together the first core member 21 and the second core member 23 on which the GMR head 20 is response to the magnitude and the direction of the external magnetic field. Then, when the magnetization direction of the free magnetization layer 45 is opposite (antiparallel) with respect to the magnetization direction of the fixed magnetization layer 43, the resistance value to the current flowing to the spin valve film 40 exhibits its maximum. On the other hand, when the magnetization direction of the free magnetization layer 45 is the same (parallel) direction with respect to the magnetization direction of the fixed magnetization layer 43, the resistance value to the current flowing to the spin valve film 40 exhibits its minimum. Since the electric resistance of the spin valve film 40 varies in response to an external magnetic field applied thereto in this manner, it functions as a magnetic sensing device for reading the variation of the electric resistance to detect a magnetic signal from the magnetic tape 2.

It is to be noted that the ground layer 41 and the protective film 46 are provided in order to suppress an increase of the specific resistance of the spin valve film 40 and are made of, for example, Ta and so forth.

In order to stabilize the operation of the GMR element 27, a pair of permanent magnet films 28a and 28b for applying a bias magnetic field to the GMR element 27 formed.

It is to be noted that, while the GMR head 20 and elements around the GMR element 27 are shown in an enlarged scale in FIGS. 3 and 4 in order to facilitate the understanding of the characteristic, actually, the GMR element 27 is very small when compared with the first core member 21 and the second core member 23, and the GMR head 20 is exposed to the outside almost only at an upper end face of the medium sliding face 20a where the first core member 21 and the second core member 23 confront with each other.

The GMR head 20 described above is adhered to a chip base (not shown), and the externally connecting terminals 31a and 31b are connected electrically to connection terminals provided on the chip base. The GMR head 20 provided on the chip base is applied to and attached as the reproducing magnetic heads 12a and 12b to the rotary drum 9 shown in FIG. 2.

Incidentally, since the magnetic tape apparatus performs reproduction an operation in a state wherein the GMR head 20 contacts directly with the magnetic tape 2, a protective film, such as a DLC (Diamond Like Carbon) film, cannot be formed on the medium sliding face 20a of the GMR head 20 which slidably moves on the magnetic tape 2. Therefore, in a conventional magnetic tape apparatus, the medium sliding face of the GMR head touches directly with the atmospheric air, and there is a problem that the GMR head is likely to suffer from corrosion and so forth in a high-temperature, high-humidity atmosphere or a seawater atmosphere.

Taking this into consideration, according to the present invention, even where a protective film is not formed on the medium sliding face 20a of the GMR head 20, an appropriate reproduction operation from the magnetic tape 2 is achieved by applying a spin valve film which exhibits a superior corrosion resistance and maintains a high magneto-resistance variation ratio.

In particular, the antiferromagnetic layer 42 which composes the spin valve film 40 is formed from a material which exhibits a superior corrosion resistance, and it may be formed suitably, for example, from PtMn. Further, the antiferromagnetic layer 42 may be formed not only from PtMn but also from NiO, IrMn, CrMnPt, α-Fe1O1, RhMn, NiMn, PdPtMn and so forth, which are superior in corrosion resistance.

Figure 6:
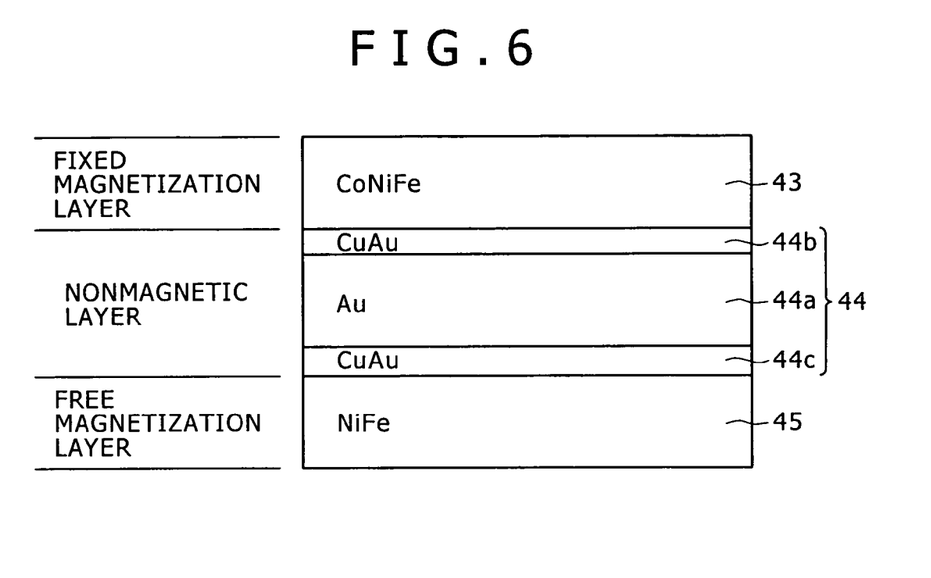
FIG. 6 is a schematic view showing a structure of a spin valve film according to the present invention.

Referring to FIG. 6, the nonmagnetic layer 44 which composes the spin valve film 40 includes a conductive layer 44a, a first interface layer 44b, and a second interface layer 44c. The conductive layer 44a is made of a material which has a conductivity and exhibits a superior corrosion resistance and a high conductivity. The first interface layer 44b is made of a material having a high GMR ratio and a high corrosion resistance and is formed on an interface between the fixed magnetization layer 43 and the nonmagnetic layer 44. The second interface layer 44c is made of a material having a high GMR ratio and a high corrosion resistance and is formed on an interface between the conductive layer 44a and the free magnetization layer 45.

Figure 7:
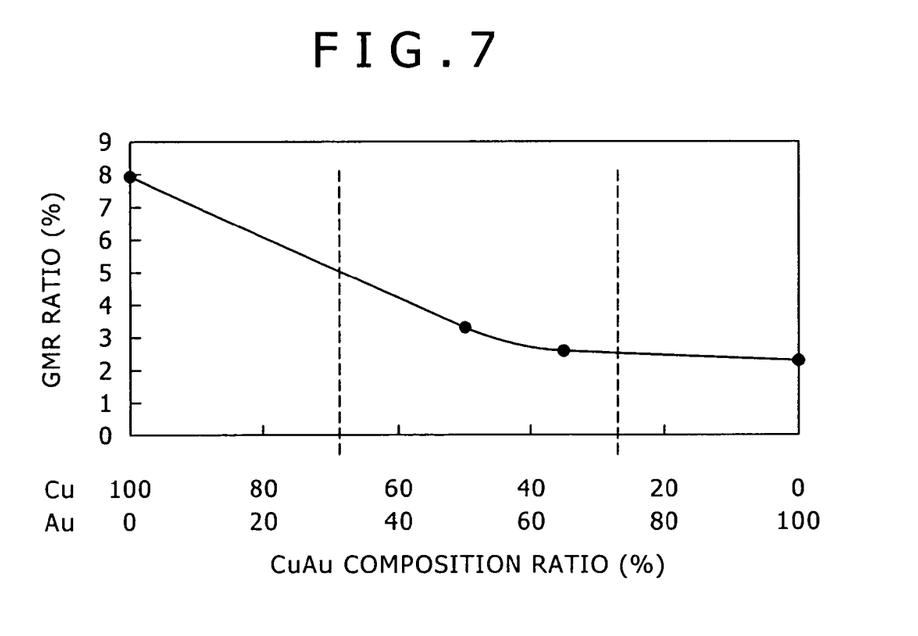
FIG. 7 is a diagram illustrating a variation of the GMR ratio with respect to the CuAu composition ratio.
Figure 8:
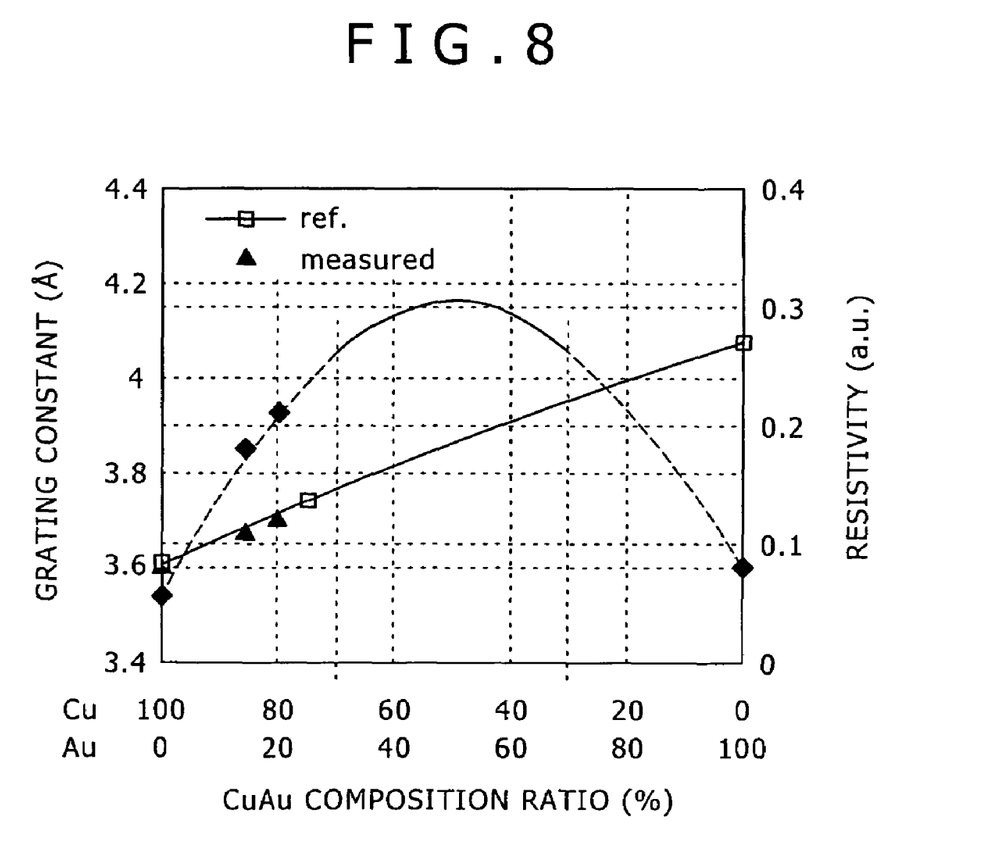
FIG. 8 is a diagram illustrating a variation of the resistivity and the grating constant with respect to the CuAu composition ratio.

The conductive layer 44a may be made of a material having a resistivity lower than those of the first interface layer 44b and the second interface layer 44c. For example, as seen in FIG. 6, the conductive layer 44a is made of Au, and the first interface layer 44b and the second interface layer 44c are made of CuAu. It is to be noted that the conductive layer 44a otherwise may be made of Pt, Ni, Pd, Cr, CuPd, CuPt, CuNi or CuCr, and the first interface layer 44b and the second interface layer 44c may be made of the same material or different materials (CuPd, CuPt, CuRu, CuNi or CuRh).

Where the first interface layer 44b and the second interface layer 44c are made of CuAu, the GMR ratio of the spin valve film 40 varies (FIG. 7), and besides the resistivity and the grating constant vary (FIG. 8) in response to the ratio of the composition. From FIGS. 7 and 8, where the composition ratio of Au is higher than that of Cu, the GMR ratio is low and the resistivity is low while the grating constant is low. However, where the composition ratio of CU is higher than that of Au, the GMR ratio is high and the resistivity is low while the grating constant is low.

Accordingly, the spin valve film 40 according to the present invention is formed such that the composition ratio of CuAu of the first interface layer 44b and the second interface layer 44c is within a range of Cu:Au=3:7 to 7:3, so that the spin valve film 40 may be a film which has a high sensitivity and is superior in corrosion resistance. If the spin valve film 40 is formed such that the composition ratio of CuAu is within the range of 3:7 to 7:3, then from FIGS. 7 and 8, the GMR ratio ranges from approximately 2.5 to 5.2% and the resistivity ranges from 0.27 to 0.31 a.u., while the grating constant ranges from 4.05 to 4.16 angstroms.

Further, a corrosion test of the spin valve film 40 was conducted using an electrochemical technique to measure the variation of the resistance before and after the corrosion test, and after the corrosion test, an observation of the surface of the spin valve film 40 was performed to check whether or not corrosion occurred. It is to be noted that, in the corrosion test described, the corrosion potential to a standard hydrogen electrode was measured, which is measured when the standard hydrogen electrode is immersed in NaCl solution of a density of 0.1 mol/L using the standard hydrogen electrode (SHE) as a reference electrode.

Figure 9:
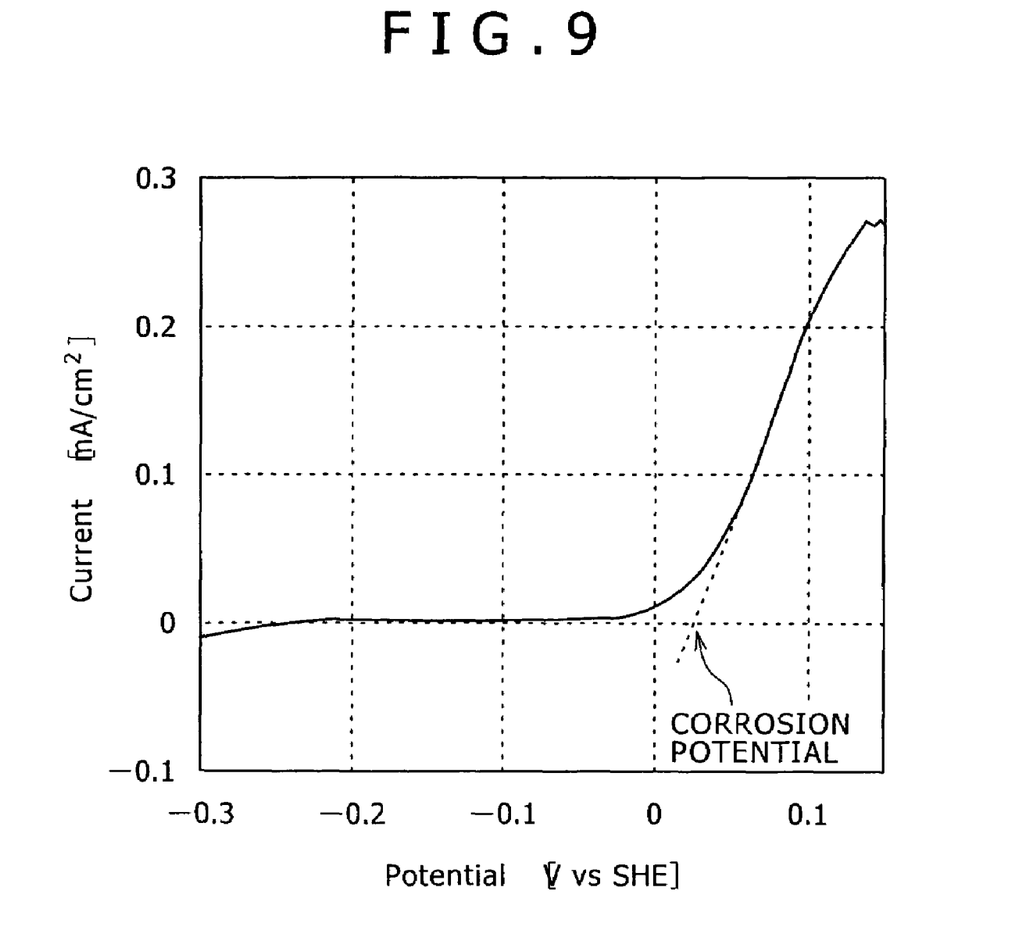
FIG. 9 is a diagram illustrating a definition of a corrosion potential.

Incidentally, the corrosion potential varies depending upon the type and the concentration of the solution. Particularly, the corrosion potential of a metal or an alloy varies over a wide range depending upon whether or not there is a reaction with Cl. Accordingly, in the present corrosion test, paying attention to the occurrence of corrosion under a severe environment such as a high-temperature, high-humidity environment or a seawater environment, the corrosion potential was measured where a NaCl solution of the concentration of 0.1 mol/L was used in order to prevent such an occurrence of corrosion. The potential of a value obtained by extrapolation from such a polarization curve as seen in FIG. 9, which is obtained where a predetermined sample is used when current of a current density higher than 0.1 MA/cm$^2$ at the sample side electrode flows, is defined as the corrosion potential (reference document: Satoru OIKAWA et al., "Physical properties of spin valve materials", The Institute of Electronics, Information and Communication Engineers, MR96-91 (1997-01), pp. 21-28).

Further, in the present corrosion test, the measurement of the corrosion potential was conducted at room temperature (approximately 20° C.) using Al.AgCl for the reference electrode and using Pt for the measurement electrode. Then, a correction from the measured corrosion potential to a potential at the standard hydrogen electrode (SHE) was performed, and the resulting value was determined as the corrosion potential according to the present corrosion test. It is to be noted that the potential increasing rate upon measurement was approximately 0.5 mV/sec. The film thickness of the sample was approximately 100 nm, and the pH of the NaCl solution was 7.

Further, with regard to the corrosion potential and the resistance variation before and after the corrosion test, any of the following methods can be applied. In particular, in order to investigate the film characteristic, the corrosion potential and reinforce variation are measured on a single layer film of each of the layers which form the spin valve film 40. In order to investigate the affinity of films with a local cell effect and so forth take into consideration, are measured on a laminated film wherein the fixed magnetization layer 43 and the free magnetization layer 45, which make the principal part of the spin valve film 40, are laminated with the nonmagnetic layer 44 interposed therebetween. Further, they are measured on a laminated film wherein the layers of the spin valve film 40 are laminated.

Further, with regard to the surface observation, taking the test on the single layer film and the local cell effect into consideration, a test on a laminated film wherein the layers are laminated on a ground film made of a metal having a high corrosion potential such as, for example, Au was conducted. This is because a laminated film in contact with Au tends to corrode rather than a single layer film by the local cell effect.

Figure 10:
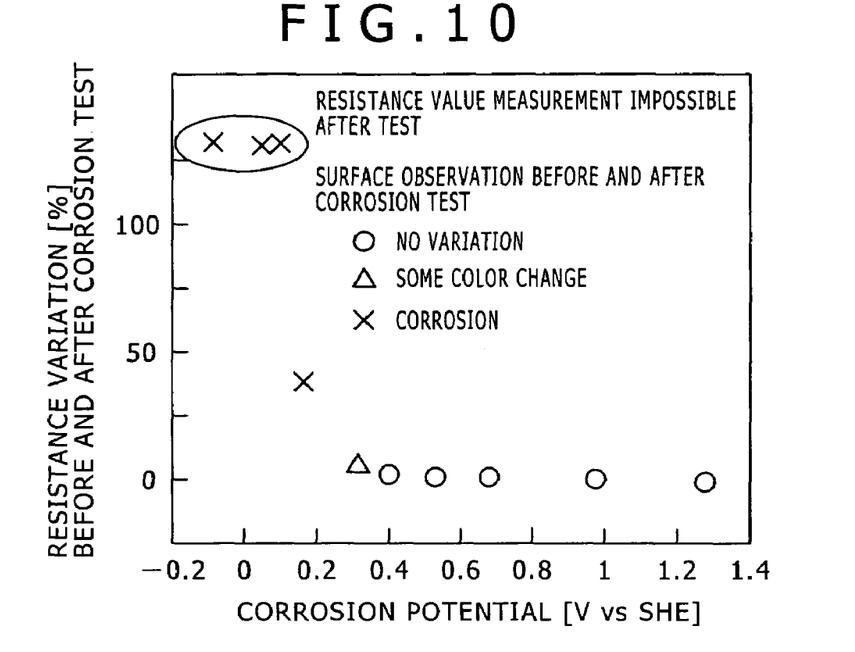
FIG. 10 is a diagram illustrating a relationship between the corrosion potential and the resistance variation before and after a corrosion test and a result of surface observation.

A plurality of samples of the spin valve film 40 was produced, and the corrosion potential and the resistance were measured and the surface observation was conducted for the samples. A relationship of the measured corrosion potential and resistance variation before and after the corrosion test and a result of the surface observation are illustrated in FIG. 10. It is to be noted that a mark ○ indicates that no variation occurred on the surface, and another mark Δ indicates that some color change occurred on the surface, while a further mark x indicates that corrosion occurred on the surface.

As seen from FIG. 10, the resistance variation before and after the corrosion test and the surface observation result exhibit a great variation across a corrosion potential of +0.4 [V vs SHE]. In particular, it was found that, when the corrosion potential is higher than +0.4 [V vs SHE], the occurrence of corrosion is not found on the surface of the spin valve film 40 and also the resistance variation before and after the corrosion test is small. On the other hand, where the corrosion potential is lower than +0.4 [V vs SHE], corrosion appeared on the surface of the spin valve film 40 and the resistance variation before and after the corrosion test increased suddenly. As the corrosion potential was further lowered, the corrosion proceeded to such a state that the resistance measurement was impossible.

From the foregoing, for the spin valve film 40, preferably, the corrosion potential of a standard hydrogen electrode measured when it is immersed in NaCl solution of the density of 0.1 mol/L is set higher than +0.4 [V vs SHE]. This prevents the appearance of corrosion on the spin valve film of the GMR head and maintains a high magneto-resistance variation ratio.

Now, the fixed magnetization layer 43 and the free magnetization layer 45, which form the spin valve film 40, are described. To the fixed magnetization layer 43 and the free magnetization layer 45, NiFe or CoNiFe is applied, which exhibits a superior corrosion resistance and a good soft magnetic characteristic. Both NiFe and CoNiFe may be applied to the fixed magnetization layer 43 and the free magnetization layer 45 at the same time. And, only NiFe may be applied to the fixed magnetization layer 43 and the free magnetization layer 45, and vice versa. Further, the fixed magnetization layer 43 and the free magnetization layer 45 may have a laminated structure wherein such alloy layers are laminated or a laminated ferri-structure wherein layers of any of such alloys and nonmagnetic layers made of, for example, Ru are laminated alternately.

It is to be noted that, in the spin valve film 40, the fixed magnetization layer 43 and the free magnetization layer 45 may include at least one or two or more selected from Au, Ir, Pt, Al, Rh, Cr, Pd and Ru added to NiFe or CoNiFe having such a composition ratio as given hereinabove.

The magnetic tape apparatus 1 configured in such a manner as described above includes the GMR head 20 having the spin valve film 40 wherein the nonmagnetic layer 44 includes the conductive layer 44a made of a material having a low resistivity and a corrosion resistance and the first interface layer 44b and the second interface layer 44c made of another material having a high GMR ratio and a corrosion resistance. Therefore, the GMR effect on the interface between the nonmagnetic layer 44 and the fixed magnetization layer 43 and the interface between the nonmagnetic layer 44 and the free magnetization layer 45 can be raised. Further, since the total amount of conduction electrons can be increased, a high corrosion resistance and a high GMR sensitivity can be achieved without forming a protective film, such as a DLC, on the surface of the head. Further, the magnetic tape apparatus 1 according to the present invention also can exhibit a high GMR sensitivity under a high-temperature, high-humidity environment or a corroding environment.

It is to be noted that the present invention can be applied not only to the GMR head 20 having such a configuration as described above but also can be applied to a composite magnetic head wherein, for example, an inductive type magnetic head which makes use of electromagnetic induction is laminated on a GMR head. The present invention also can be applied to a magnetic tunnel effect type magnetic head which includes a magnetic tunnel junction element wherein a pair of magnetic layers are laminated with an insulating layer interposed therebetween and the conductance of tunnel current flowing from one to the other of the magnetic layers varies depending upon the relative angle between magnetization directions of the magnetic layers.

While a preferred embodiment of the present invention has been described using specific terms, such description is for illustrative purposes only, and it is to be understood that changes and variations may be made without departing from the spirit or scope of the following claims.

What is claimed is:

1. A magneto-resistance effect type magnetic head, comprising:
    a magnetic sensing device including a spin valve film that detects a magnetic signal from a magnetic recording medium, while contacting the magnetic recording medium in a sliding motion, said spin valve film including:
        an antiferromagnetic layer,
        a fixed magnetization layer having magnetization fixed in a predetermined direction by an exchange coupling magnetic field acting between said antiferromagnetic layer and said fixed magnetization layer, a free magnetization layer having a magnetization direction which varies in response to an external magnetic field, and a nonmagnetic layer for magnetically isolating said fixed magnetization layer and said free magnetization layer from each other, said nonmagnetic layer being formed from a conductive layer, a first interface layer formed on an interface between said fixed magnetization layer and said conductive layer, and a second interface layer formed on an interface between said conductive layer and said free magnetization layer, said conductive layer having a lower resistivity than the first interface layer and the second interface layer;

said conductive layer being made of at least one of Au, Pt, Ni, Pd, Cr, CuPd, CuPt, CuNi and CuCr, and said first and second interface layers being made of, at least one different material than the conductive layer, including CuAu, CuPd, CuPt, CuRu, CuNi and CuRh; and said fixed magnetization layer and said free magnetization layer said made of at least one of NiFe and CoNiFe.

2. The magneto-resistance effect type magnetic head as claimed in claim 1, wherein said magnetic head is carried on a rotary drum and detects a magnetic signal while sliding on a magnetic tape by helical scanning.

3. The magneto-resistance effect type magnetic head as claimed in claim 1, wherein said first and second interface layers have a ratio of Cu:X ranging from 3:7 to 7:3, X being one or a combination of Au, Pd, Pt, Ru, Ni or Rh.

4. The magneto-resistance effect type magnetic head as claimed in claim 1, wherein said magneto-resistance effect type magnetic head has a magnetic resistance variation coefficient ranging from approximately 2.5 to 5.2%.

5. The magneto-resistance effect type magnetic head as claimed in claim 1, wherein said magneto-resistance effect type magnetic head has a resistivity ranging from 0.27 to 0.31 a.u.

6. A magnetic tape apparatus, comprising:
a tape feeding section that feeds a magnetic tape; and
a magneto-resistance effect type magnetic head including a spin valve film that detects a magnetic signal from a magnetic tape fed by said tape feeding section, while contacting the magnetic tape in a sliding motion;

said spin valve film including:
an antiferromagnetic layer,
a fixed magnetization layer having magnetization fixed in a predetermined direction by an exchange coupling magnetic field between said antiferromagnetic layer and said fixed magnetization layer,
a free magnetization layer having a magnetization direction which varies in response to an external magnetic field, and
a nonmagnetic layer for magnetically isolating said fixed magnetization layer and said free magnetization layer from each other, the nonmagnetic layer being formed from a conductive layer, a first interface layer formed on an interface between said fixed magnetization layer and said conductive layer, and a second interface layer formed on an interface between said conductive layer and said free magnetization layer, said conductive layer having a lower resistivity than the first interface layer and the second interface layer;
said conductive layer being made of Au, Pt, Ni, Pd, Cr, CuPd, CuPt, CuNi or CuCr, and said first and second interface layers being made of at least one different material than the conductive layer, including a material selected from CuAu, CuPd, CuPt, CuRu, CuNi or CuRh; and
said fixed magnetization layer and said free magnetization layer being made of NiFe or CoNiFe.

7. The magnetic tape apparatus as claimed in claim 6, wherein said magnetic head is carried on a rotary drum and detects a magnetic signal while sliding on said magnetic tape by helical scanning.

8. The magnetic tape apparatus as claimed in claim 6, wherein said first and second interface layers have a ratio of Cu:X ranging from 3:7 to 7:3, X being one or a combination of Au, Pd, Pt, Ru, Ni or Rh.

9. The magnetic tape apparatus as claimed in claim 6, wherein said magnetic head has a magnetic resistance variation coefficient ranging from approximately 2.5 to 5.2%.

10. The magnetic tape apparatus as claimed in claim 6, wherein said magnetic head has a resistivity ranging from 0.27 to 0.31 a.u.

* * * * *